(12) United States Patent
Chen et al.

(10) Patent No.: US 8,776,526 B2
(45) Date of Patent: Jul. 15, 2014

(54) MOTOR WITH SOLID FUEL INSTALLED WITHIN COMBUSTION CHAMBER AND VORTEX GENERATOR INSTALLED ON INNER WALL OF COMBUSTION CHAMBER

(75) Inventors: Yen-Sen Chen, Hsinchu (TW); Jong-Shinn Wu, Hsinchu (TW); Tzu-Hao Chou, New Taipei (TW)

(73) Assignee: National Applied Research Laboratories, Taipei (TW)

( * ) Notice: Subject to any disclaimer, the term of this patent is extended or adjusted under 35 U.S.C. 154(b) by 830 days.

(21) Appl. No.: 13/018,517

(22) Filed: Feb. 1, 2011

(65) Prior Publication Data
US 2011/0203256 A1     Aug. 25, 2011

(30) Foreign Application Priority Data
Feb. 24, 2010   (TW) ................. 99105242 A

(51) Int. Cl.
   *F02K 7/10*   (2006.01)
(52) U.S. Cl.
   USPC .............. 60/769; 60/253; 60/39.464; 60/767; 60/219; 60/255; 60/258
(58) Field of Classification Search
   CPC .............. F02K 9/00; F02K 9/08; F02K 9/32; F02K 9/34; F02K 9/80; F02K 9/90; F02K 7/105
   USPC .............. 60/251, 253, 781, 39.464, 767, 768, 60/769, 219, 234, 254, 255, 257, 258
   See application file for complete search history.

(56) References Cited

U.S. PATENT DOCUMENTS

| | | | | |
|---|---|---|---|---|
| 2,412,266 | A | * | 12/1946 | Hoagland ........................ 60/201 |
| 3,162,013 | A | * | 12/1964 | Scobee ....................... 60/39.821 |
| 3,414,217 | A | * | 12/1968 | Kesting ......................... 244/3.23 |
| 4,124,976 | A | * | 11/1978 | Holzman ........................ 60/204 |
| H1007 | H | * | 1/1992 | Schadow et al. ................ 60/210 |
| 6,381,949 | B1 | * | 5/2002 | Kreiner et al. .................. 60/258 |
| 6,880,326 | B2 | * | 4/2005 | Karabeyoglu et al. .......... 60/251 |
| 7,137,255 | B2 | * | 11/2006 | Schmotolocha et al. ....... 60/761 |
| 2008/0256924 | A1 | * | 10/2008 | Pederson et al. ................ 60/245 |

* cited by examiner

*Primary Examiner* — Phutthiwat Wongwian
*Assistant Examiner* — Steven Sutherland
(74) *Attorney, Agent, or Firm* — Birch, Stewart, Kolasch & Birch, LLP

(57) ABSTRACT

The present invention provides a motor including a combustion chamber, an oxidizer injector, a vortex generators and a nozzle. The combustion chamber can be used to dispose a solid fuel, and the oxidizer injector is used to control the flow rate of an oxidizer and to inject the oxidizer into the combustion chamber. The vortex generators is disposed on the inner wall of the combustion chamber for generating eddies to enhance the mixing of the fuel and the oxidizer. Additionally, the nozzle is connected with the combustion chamber for exhausting the gas generated by the combustion of the propellants.

9 Claims, 2 Drawing Sheets

MOTOR WITH SOLID FUEL INSTALLED WITHIN COMBUSTION CHAMBER AND VORTEX GENERATOR INSTALLED ON INNER WALL OF COMBUSTION CHAMBER

FIELD OF THE INVENTION

The present invention relates to a motor, and more specifically, it relates to a hybrid motor.

BACKGROUND OF THE INVENTION

The basic structure of the rocket motor includes the combustion chamber and the nozzle. Wherein, fuel can be mixed in the combustion chamber and be combusted to generate high pressure and high temperature gas, and this gas will be ejected from nozzle to generate reacting force to propel the rocket.

Furthermore, the prior rocket motor includes solid rocket motor, liquid rocket motor, gas rocket motor and hybrid rocket motor, etc.

For liquid rocket motor, in addition to the above mentioned combustion chamber and nozzle, it further includes propellant supply system, wherein the propellant supply system is used to transport the liquid propellant stored in the storage device (it usually includes liquid oxidizer and fuel) to combustion chamber for mixing and combustion. The liquid rocket motor has advantages such as high specific impulse, long working time and easy adjustment of propelling force. However, it also has disadvantages such as complicated system, high risk in malfunction rate, not easy of long term storage of liquid propellants and of bulky volume, etc.

The propellant of the solid rocket motor is either double based propellant or composite propellant with premixed solid fuel and oxidizer, which is installed directly in the combustion chamber. As compared to liquid rocket motor, solid rocket motor has advantages such as simple system, easy operation, longer term storage and smaller volume, however, it also has disadvantages such as lower specific impulse, relatively shorter combustion time, high difficulty in the adjustment of the propelling force, require strict operational safety procedures to prevent accidental ignition or explosion, etc.

Therefore, the hybrid rocket motor with simultaneous use of solid fuel and liquid oxidizer is thus developed. In hybrid type rocket motor, liquid oxidizer is injected into combustion chamber loaded with solid fuel to be mixed with the vaporized substance of the fuel and then ignited for combustion, the generated high temperature and high pressure combusted gas will then be ejected through the nozzle to generate the propelling force needed for the flight. Since the hybrid rocket motor is a combination of the characteristics of solid rocket motor and liquid rocket motor, it thus has advantages such as: low cost, simplicity, safety and low impact to the environment as compared to conventional solid rockets, etc.

However, since in hybrid rocket motor, liquid oxidizer follows the surface of solid fuel to be mixed with solid fuel that is heated and decomposed and to supply the continuous growth of the combustion flame, hence, such slow mixing mechanism leads to a very long combustion chamber design of conventional hybrid rocket motor.

SUMMARY OF THE INVENTION

Therefore, one scope of the present invention is to provide a motor, which can enhance the mixing efficiency and combustion rate of liquid oxidizer and solid fuel, meanwhile, it can also enhance the performance of motor and solve the prior art issue.

According to a preferred embodiment, the motor includes combustion chamber, oxidizer injector, solid grain, vortex generators and nozzle. The combustion chamber is filled with a solid fuel segment, and oxidizer injector is used to control the oxidizer flow rate and to inject oxidizer into the combustion chamber. Moreover, vortex generators are installed at the inner wall of the combustion chamber and protruded over the solid fuel surface so as to generate a mutually enhancing vortex pair system within the combustion chamber to boost the mixing between oxidizer and fuel, and to enhance the heat transfer rate towards the solid fuel surface. In addition, nozzle is connected to the combustion chamber to accelerate the hot gas products generated through the combustion.

The advantage and spirit of this invention can be further understood through the following detailed description of the invention and the attached drawings.

DETAILED DESCRIPTION OF THE INVENTION

The present invention provides a motor. In the following, the preferred embodiment of the present invention and the real application sample is going to be described in detail so as to fully describe the features, spirit and advantages of the present invention.

Please note that, the motor described in this invention can be, but not limited to, solid-liquid hybrid motor, that is, motor that uses solid fuel and liquid oxidizer. In addition, the motor this invention can be applied in all kinds of suitable flying vehicles, for example, but not limited to, air plane, rocket and missile, etc.

Figure 1:
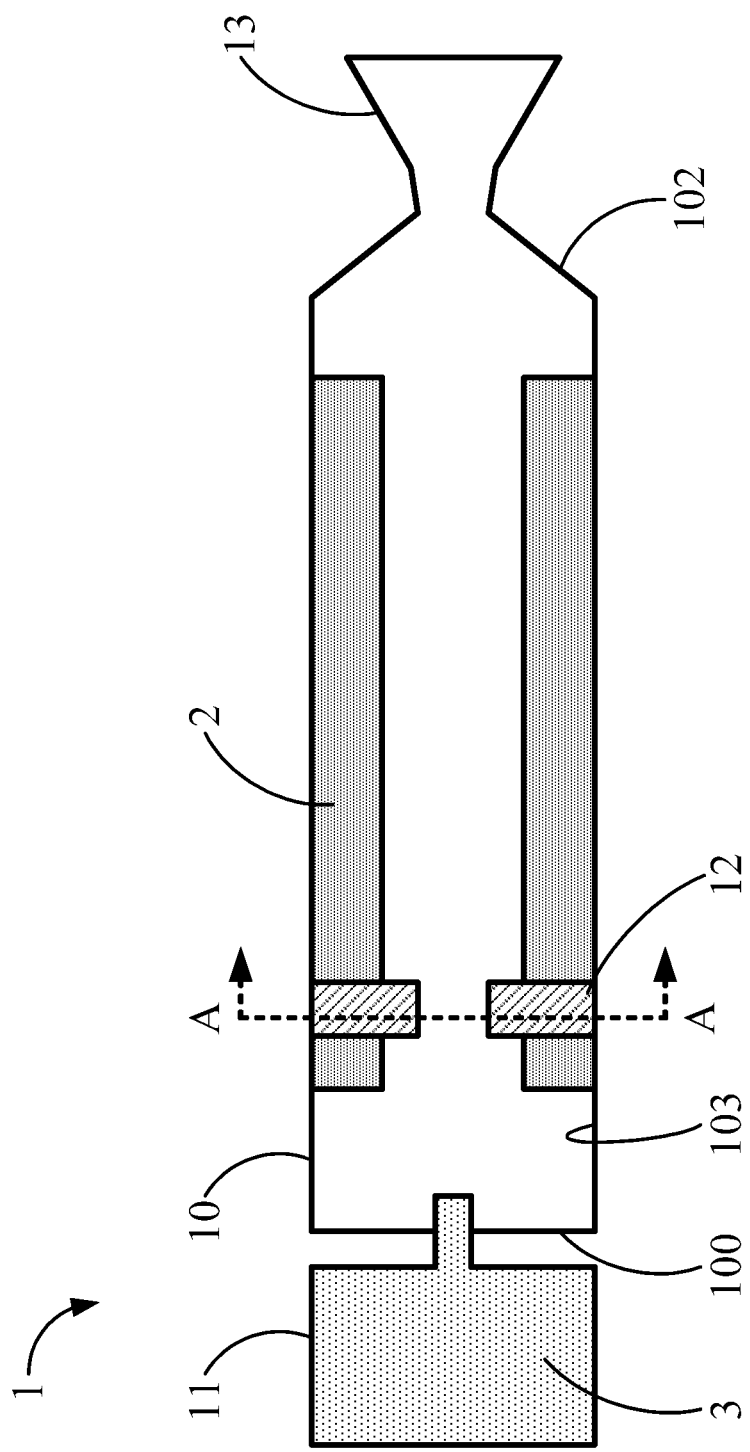
FIG. 1 illustrates the motor of one preferred embodiment according to the present invention.
Figure 2:
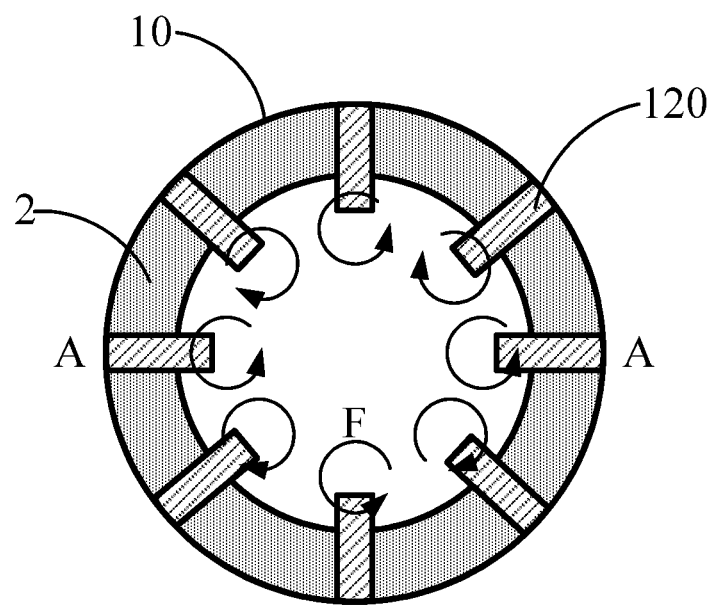
FIG. 2 illustrates the cross section along A-A line of motor of FIG. 1.

Please refer to FIG. 1 and FIG. 2. FIG. 1 illustrates the motor according to one embodiment of this invention; FIG. 2 illustrates the cross sectional drawing along A-A line of the motor of FIG. 1. As shown in FIG. 1 and FIG. 2, motor 1 of this embodiment includes combustion chamber 10, oxidizer injector 11, vortex generators 12 and nozzle 13.

Combustion chamber 10 contains relative first end 100 and second end 102, and within combustion chamber 10, it is installed with fuel 2. Wherein, oxidizer injector 11 is connected to the first end 100 of combustion chamber 10, and nozzle 13 is connected to the second end 102 of combustion chamber 10. Oxidizer injector 11 can accommodate oxidizer 3 and can inject oxidizer 3 into combustion chamber 10.

In practical application, fuel 2 can be solid, for example, hydroxyl-terminated poly-butadiene (HTPB), but is not limited to this. In addition, in practical application, oxidizer 3 can be Nitrous Oxide (N2O), but is not limited to this.

Vortex generators 12 is installed at the inner wall 103 of combustion chamber 10, and the distance between vortex generators 12 and first end 100 is smaller than the distance between vortex generators 12 and second end 102. Meanwhile, vortex generators 12 can generate mixed gas current F within combustion chamber 10 to help the mixing between oxidizer 3 and fuel 2. In addition, nozzle 13 is connected to combustion chamber 10 to exhaust the gas generated after the combustion of fuel 2.

Please note that, in this preferred embodiment, vortex generators 12 includes the surrounded and installed multiple vanes 120 (for example, but not limited to 4 to 24 pieces) on inner wall 103. Moreover, the end part of each vane 120 protrudes over the surface of fuel 2.

In practical application, those vanes 120 can be made up of carbon fiber composite material, alloy material or other suitable heat resistant material. Particularly, in practical application, the material of vane 120 is material with suitable thermal and erosion resistant characteristics. When fuel 2 gets combusted, the surface of vane 120 and fuel 2 can get annealed at the same time so that the length of vane 120 protruding out of the surface of fuel 2 can remain suitable length during the combustion process of fuel 2, hence, it can continuously provide the function of enhancing mixing and combustion efficiencies.

Figure 3:
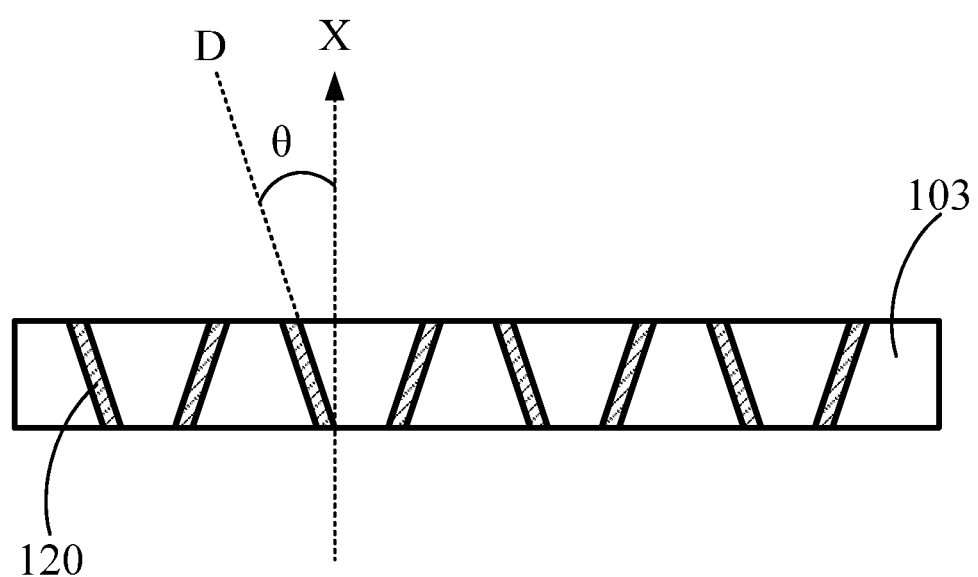
FIG. 3 illustrates the installation of vane 120 of vortex generators 12 of one preferred embodiment according to the present invention.

Please refer to FIG. 3. FIG. 3 illustrates the installation of vane 120 of vortex generators 12 according to one preferred embodiment of this invention. As shown in the figure, in the present embodiment, multiple vanes 120 of vortex generators 12 are installed in mirror image way. Meanwhile, the installation direction D of each of the vane 120 forms an angle θ with axial direction X of inner wall 103, and the angle is in the range from +/−5 to +/−45 degrees.

Therefore, the vortex generators 12 of this invention can, in the axial direction flow field, lead to the generation of vortex clustering enhancement effect in its downstream region, that is, it can generate diffusive type combustion surface with enhanced mixing and heating on the surface of solid fuel 2 so as to enhance the combustion between fuel 2 and oxidizer 3. Moreover, the heat transfer effect close to the surface of solid fuel 2 will be increased accordingly too, and the regression rate of the solid fuel surface will be enhanced too. Furthermore, the entire combustion efficiency of motor 1 of this invention can be enhanced, and the thrust performance in terms of specific impulse can be enhanced too.

To prove the performance of motor of the present invention, we have performed combustion and thrust experiment of two hybrid motors. In the first experiment, traditional hybrid motor has used N2O oxidizer and HTPB solid fuel, and the ignition of a small section of pre-mixing solid pyro grain is used to start the combustion with thrust measurements of the motor. In addition, in the second experiment, we have, in the above mentioned hybrid motor, added vortex generators of this invention followed by performing combustion and thrust measurements.

From the experiments, it has been found that the rocket motor performance is enhanced by 37% using this invention as compared to the prior art hybrid rocket motor. Its average thrust force is enhanced from 60 kgf (ISP=160 sec) to 82 kgf (ISP=218.9 sec). And, in average, the overall performance of the motor can be enhanced by about 20% to 40%.

To sum up, it can be seen that the motor of this invention, through the clustering enhancement effect of vortex generated in the axial flow field by vortex generators, mixing-enhancement flame zone is generated along the surface of solid fuel, and the mixing between fuel and oxidizer is then further enhanced. Meanwhile, the heat transfer effect close to the surface of solid fuel can also be increased accordingly, and the regression rate of the solid grain surface can also be enhanced too. Furthermore, the entire combustion efficiency of the motor of this invention can be increased, and the thrust performance can be enhanced too.

Although the present invention is disclosed through a better embodiment as above, yet it is not used to limit the present invention, anyone that is familiar with this art, without deviating the spirit and scope of the present invention, can make any kinds of change, revision and finishing; therefore, the protection scope of the present invention should be based on the scope as defined by the following attached "what is claimed".

What is claimed is:

1. A motor, which includes:
a combustion chamber, wherein one fuel is installed within the combustion chamber;
an oxidizer injector, which is connected to the combustion chamber to inject oxidizer into the combustion chamber;
a vortex generator, installed on one of inner walls of the combustion chamber, which is used to generate a mixed gas stream within the combustion chamber so as to assist the mixing between the oxidizer and the fuel; and
a nozzle, which is connected to the combustion chamber so as to exhaust the gas generated by the combustion of the fuel,
wherein the fuel is solid.

2. The motor of claim 1, wherein the combustion chamber has relative a first end and a second end, and the oxidizer injector is connected to the first end of the combustion chamber, and the nozzle is connected to the second end of the combustion chamber, meanwhile, the distance between the vortex generator and the first end is smaller than the distance between the vortex generator and the second end.

3. The motor of claim 1, wherein the fuel is installed on the inner wall of the combustion chamber.

4. The motor of claim 1, wherein the oxidizer is liquid.

5. The motor of claim 1, wherein the vortex generator includes a plurality of vanes surrounded by and installed on the inner wall.

6. The motor of claim 5, wherein the vanes are made up of carbon fiber composite material or alloy material.

7. The motor of claim 5, wherein each two immediately adjacent vanes are symmetrically installed with each other.

8. The motor of claim 7 wherein an installation direction of each of said plurality of vanes and an axial direction of the inner wall forms an angle in the range of between 5 degrees and 45 degrees or between −5 degrees and −45 degrees.

9. The motor of claim 5, wherein the fuel is installed on the inner wall of the combustion chamber, and the end parts of said plurality of vanes are protruding on the surface of the fuel.

* * * * *